US010520338B2

(12) United States Patent
Gruca et al.

(10) Patent No.: US 10,520,338 B2
(45) Date of Patent: Dec. 31, 2019

(54) OPTICAL FIBER-BASED SENSOR SYSTEM HAVING DUAL OPTICAL FIBERS PROVIDING MEASUREMENTS OF A FIRST AND A SECOND PHASE DIFFERENCE

(71) Applicant: OPTICS11, Amsterdam (NL)

(72) Inventors: Grzegorz Gruca, Amsterdam (NL); Niek Rijnveld, Amsterdam (NL)

(73) Assignee: OPTICS11, Amsterdam (NL)

( * ) Notice: Subject to any disclaimer, the term of this patent is extended or adjusted under 35 U.S.C. 154(b) by 203 days.

(21) Appl. No.: 15/751,662

(22) PCT Filed: Aug. 11, 2016

(86) PCT No.: PCT/NL2016/050575
§ 371 (c)(1),
(2) Date: Feb. 9, 2018

(87) PCT Pub. No.: WO2017/026896
PCT Pub. Date: Feb. 16, 2017

(65) Prior Publication Data
US 2019/0331508 A1    Oct. 31, 2019

(30) Foreign Application Priority Data

Aug. 11, 2015 (EP) ..................................... 15180666
Feb. 17, 2016 (NL) ..................................... 2016277

(51) Int. Cl.
*G01D 5/353* (2006.01)

(52) U.S. Cl.
CPC ................. *G01D 5/35325* (2013.01)

(58) Field of Classification Search
CPC ..... G01L 1/246; G01K 11/3206; E21B 47/06; G01D 5/35303; G01D 5/35316; G01D 5/268

(Continued)

(56) References Cited

U.S. PATENT DOCUMENTS

| 5,869,835 A | 2/1999 | Udd |
| 6,335,524 B1 * | 1/2002 | Udd ................... G01D 5/35383 250/227.14 |
| 2014/0211202 A1 | 7/2014 | Niewczas et al. |

FOREIGN PATENT DOCUMENTS

WO    0210677 A1    2/2002

OTHER PUBLICATIONS

International Search Report and Written Opinion dated Nov. 17, 2016, for International Patent Application No. PCT/NL2016/050575.

* cited by examiner

*Primary Examiner* — Que Tan Le
(74) *Attorney, Agent, or Firm* — Karceski IP Law, PLLC (57) ABSTRACT

An optical fiber-based sensor system includes a sensing optical fiber having fiber gratings that reflect light at respective wavelengths. A first fiber grating reflects light at a first wavelength. A second fiber grating reflects light at a second wavelength. The system also has a reference optical fiber. An optical read-out arrangement generates light at the first and second wavelengths. The light is injected in the sensing optical fiber and in the reference optical fiber. A first phase difference is measured between light at the first wavelength emanating from the sensing optical fiber and the reference optical fiber. In addition, a second phase difference is measured between light at the second wavelength emanating from the sensing optical fiber the reference optical fiber. A measurement result is based on a difference between the first phase difference and the second phase difference.

17 Claims, 4 Drawing Sheets

(58) Field of Classification Search
USPC .................................. 250/227.14, 227.18
See application file for complete search history.

OPTICAL FIBER-BASED SENSOR SYSTEM HAVING DUAL OPTICAL FIBERS PROVIDING MEASUREMENTS OF A FIRST AND A SECOND PHASE DIFFERENCE

CROSS-REFERENCE TO RELATED APPLICATIONS

This application is a U.S. National Stage entry of International Patent Application No. PCT/NL2016/050575, filed Aug. 11, 2016, which claims priority to both Netherland Patent Application No. NL 2016277, filed Feb. 17, 2016, and to European Patent Application No. EP 15180666.8, filed Aug. 11, 2015, the entire contents of all of which are incorporated herein by reference.

FIELD OF THE INVENTION

An aspect of the invention relates to an optical fiber-based sensor system. The optical fiber-based sensor system may be used, for example, for measuring at least one physical quantity, such as, for example: vibration, strain, temperature, pressure, sound, or elongation (stretch). Another aspect of the invention relates to an optical fiber-based sensing method.

BACKGROUND OF THE INVENTION

An optical fiber-based sensor system may comprise an optical fiber with fiber Bragg gratings. Patent publication WO 02/10677 discloses an optical sensing device containing fiber Bragg gratings, a scanning band pass filter an interferometer and multiple photo detectors. A scanning Fabry-Perot band pass filter is used to wavelength-multiplex multiple gratings in a single fiber. An unbalanced Mach-Zehnder fiber interferometer made with a 3×3 coupler can detect strain-induced wavelength shifts.

SUMMARY OF THE INVENTION

There is a need for a technique that allows achieving relatively precise measurements with an optical fiber-based sensor system.

In order to better address this need, in accordance with an aspect of the invention there is provided an optical fiber-based sensor system including:
a first optical fiber having:
a first fiber grating at a first location in the first optical fiber and reflecting light of a first wavelength; and
a second fiber grating at a second location in the first optical fiber and reflecting light of a second wavelength;
a second optical fiber; and
an optical read-out arrangement adapted to generate light of the first wavelength and of the second wavelength, to inject the light in the first optical fiber and in the second optical fiber, to measure a first phase difference between light of the first wavelength emanating from the first optical fiber and light of the first wavelength emanating from the second optical fiber, and to measure a second phase difference between light of the second wavelength emanating from the first optical fiber and light of the second wavelength emanating from the second optical fiber, and to provide a measurement result based on a difference between the first phase difference and the second phase difference that have been measured.

In accordance with another aspect, there is provided an optical fiber-based sensing method with
a first optical fiber having:
a first fiber grating at a first location in the first optical fiber and reflecting light of a first wavelength; and
a second fiber grating at a second location in the first optical fiber and reflecting light of a second wavelength; and
a second optical fiber,
wherein the method comprises the steps of:
generating light of the first wavelength and of the second wavelength;
injecting the light in the first optical fiber and in the second optical fiber;
measuring a first phase difference between light of the first wavelength emanating from the first optical fiber and light of the first wavelength emanating from the second optical fiber;
measuring a second phase difference between light of the second wavelength emanating from the first optical fiber and light of the second wavelength emanating from the second optical fiber; and
providing a measurement result based on a difference between the first phase difference and the second phase difference that have been measured.

In each of these aspects, a measurement result is provided on the basis of a difference between two respective phase difference measurements at two respective wavelengths at which two respective fiber gratings reflect light. A phase difference measurement is typically be affected by extrinsic noise and drift. The extrinsic noise and drift that affects one of two aforementioned phase difference measurements is significantly correlated with the extrinsic noise and drift that affects the other phase difference measurement. Basing the measurement result on the difference between the one and the other phase difference measurement provides a noise and drift cancellation effect. The measurement result will be more precise than a measurement result that is based on a single phase difference measurement with respect to a single fiber grating.

An embodiment may comprise at least one of the additional features that are defined in the dependent claims, which are appended to the description.

For the purpose of illustration, a detailed description of some embodiments of the invention is presented with reference to accompanying drawings.

DETAILED DESCRIPTION

Figure 1:
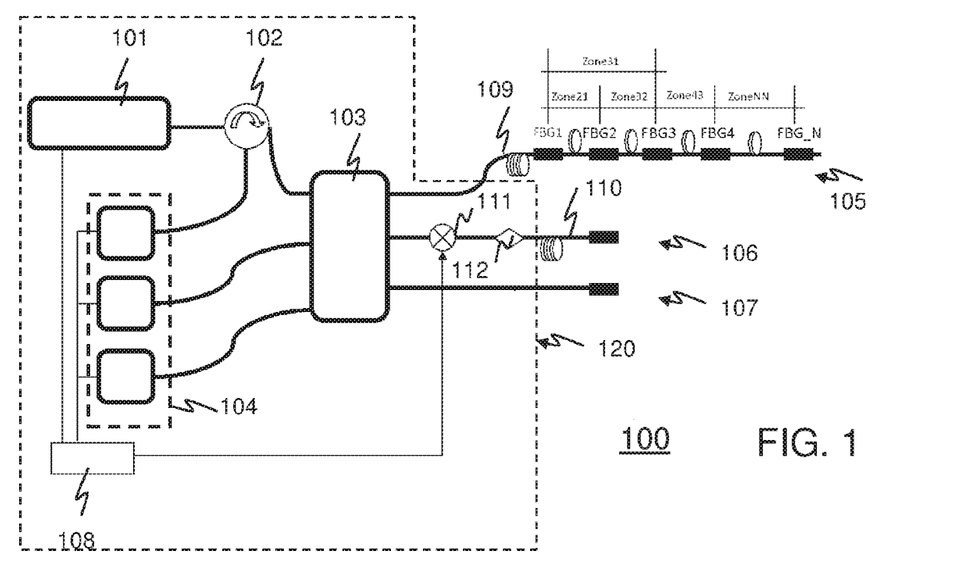
FIG. 1 is a block diagram of an optical fiber-based sensor system.

FIG. 1 schematically illustrates an optical fiber-based sensor system 100. The system is represented in a block diagram. The system may be used, for example, for measuring at least one of the following physical quantities: vibration, strain, temperature, pressure, sound, and elongation (stretch).

The system comprises a light source 101, an optical circulator 102, an optical coupler 103, an array of optical detectors 104, an optical measurement arm 105, an optical reference arm 106, a terminated end 107, and a processing and control arrangement 108. The light source 101, the optical circulator 102, the optical coupler 103, the array of optical detectors 104, and the processing and control arrangement 108 may constitute an optical read-out arrangement 120, which will be apparent from the description hereinafter. The optical read-out arrangement 120 may comprise further elements, some of which will be mentioned hereinafter.

The light source 101 may be in the form of, for example, a multiple laser array, a Super Luminescent Diode (SLD), an Amplified Spontaneous Emission (ASE) source, a tunable laser, a super continuum source, or a frequency comb. An optical detector may be in the form of, for example, a spectrometer or a photodiode. A type of optical detector that is used in the system may be related to a type of light source that is used in the system. This will be explained in greater detail hereinafter.

The optical measurement arm 105 comprises an optical fiber 109 that has various fiber Bragg gratings (FBGs). A fiber Bragg grating is present at a particular location in the optical fiber and has unique spectral reflective characteristics. That is, each fiber Bragg grating may reflect light of a certain wavelength, or in a certain wavelength range, different from respective wavelengths at which respective other fiber Bragg gratings reflect light. The optical fiber 109 of the optical measurement arm 105 will hereinafter be referred to as sensing optical fiber 109 for reasons of convenience. This does not withstand the fact that the optical measurement arm 105 may comprise various optical fibers, as will be explained hereinafter.

In effect, the various fiber Bragg gratings define various zones in the sensing optical fiber 109, as illustrated in FIG. 1. These zones may constitute measurement zones, as will be explained hereinafter. For example, in FIG. 1, a zone exists between a first fiber Bragg grating FBG1 and a second fiber Bragg grating FBG2. Similarly, another zone exists between the second fiber Bragg grating FBG2 and a third fiber Bragg grating FBG3, and yet another zone between the third fiber Bragg grating FBG3 and a fourth fiber Bragg grating FBG4. A zone may also exist between two nonadjacent fiber Bragg gratings. For example, a zone exists between the first fiber Bragg grating FBG1 and the third fiber Bragg grating FBG3.

The optical reference arm 106 also comprises an optical fiber 110. The optical fiber 110 of the optical reference arm 106 will hereinafter be referred to as reference optical fiber 110 for reasons of convenience. This does not withstand the fact that the optical reference arm 106 may comprise various optical fibers. The reference optical fiber 110 may be terminated by a mirror, or a Faraday mirror. Alternatively, the optical reference arm 106 and, more particularly, the reference optical fiber 110, may comprise various fiber Bragg gratings. Respective fiber Bragg gratings in the optical reference arm 106 may have respective unique spectral reflective characteristics similar to those of the fiber Bragg gratings in the optical measurement arm 105. The respective fiber Bragg gratings in the optical reference arm 106 may have an order that is similar to that of the respective fiber Bragg gratings in the optical measurement arm 105. The order may also be different.

Stated differently, the optical reference arm 106 may comprise respective fiber Bragg gratings that are equivalent to those in the optical measurement arm 105. These equivalent fiber Bragg gratings may be at respective locations on the optical reference arm 106 corresponding with those of the respective fiber Bragg gratings in the optical measurement arm 105. The respective locations of the respective equivalent fiber Bragg gratings may also be inversed with respect to those of the respective fiber Bragg gratings in the optical measurement arm 105. This will be explained in greater detail hereinafter.

The optical reference arm 106 may additionally comprise a phase modulator 111 and a polarization controller 112, or only one of these two elements. The phase modulator 111 may be in the form of, for example, an Electro-Optic Modulator (EOM), a Mach-Zehnder modulator, or a fiber stretcher. The terminated end 107 may comprise, for example, an index matching liquid. That is, the terminated end 107 is a non-reflective arrangement, which avoids that reflection occurs at a port of the optical coupler 103 to which the terminated end 107 is coupled.

The system basically operates as follows. The light source 101 generates light that comprises components of different wavelengths, or in wavelength ranges. These different wavelengths match with different wavelengths at which at least two fiber Bragg gratings in the optical measurement arm 105 reflect light. That is, the light that is generated comprises a component of a wavelength at which one fiber Bragg grating reflects light, and another component of another wavelength at which another fiber Bragg grating reflects light.

A part of the light from the light source 101 reaches the sensing optical fiber 109 through the optical circulator 102 and the optical coupler 103. This part of the light will propagate through the sensing optical fiber 109, reaching the respective fiber Bragg gratings that are present in this fiber at respective locations. It is assumed, by way of example, that the light comprises a component of a first wavelength at which the first fiber Bragg grating FBG1 reflects light. It is further assumed, by way of example, that the light further comprises a component of a second wavelength at which the second fiber Bragg grating FBG2 reflects light. Accordingly, the optical coupler 103 will receive reflected light from the sensing optical fiber 109 having a component of the first wavelength, as well as a component of the second wavelength.

In parallel, another part of the light from the light source 101 reaches the reference optical fiber 110 through the optical circulator 102 and the optical coupler 103. This part of the light will propagate through the reference optical fiber 110. A portion of this light will be reflected by a reflective reference element, which may be, for example, the aforementioned mirror, or an equivalent first fiber Bragg grating and an equivalent second fiber Bragg grating. Accordingly, the optical coupler 103 will receive reflected light from the reference optical fiber 110, which also comprises a component of the first wavelength and another component of the second wavelength.

The reflected light from the sensing optical fiber 109 and the reflected light from the reference optical fiber 110 are combined in the optical coupler 103. In this example, this produces two spectrally distinctive interference patterns: a first interference pattern based on light components of the first wavelength, and a second interference pattern based on light components of the second wavelength. The array of optical detectors 104 may detect both these interference patterns, as will be described in greater detail hereinafter.

The processing and control arrangement 108 receives detection signals from the array of optical detectors 104 that represent detected interference patterns. An interference pattern is associated with a fiber Bragg grating. In this example, the processing and control arrangement 108 receives a first detection signal that represents the first interference pattern, which is associated with the first fiber Bragg grating FBG1. The processing and control arrangement 108 further receives a second detection signal that represents the second interference pattern, which is associated with the second fiber Bragg grating FBG2.

The processing and control arrangement 108 can resolve an interference pattern into phase information, which pertains to the fiber Bragg grating with which the interference pattern is associated. The phase information may relate to a phase change or, stated differently, a phase difference, between light emanating from the sensing optical fiber 109 and light from the reference optical fiber 110 of the wavelength of interest. A measured phase difference may indicate, for example, a displacement of the fiber Bragg grating concerned in the sensing optical fiber 109 with respect to the reflective reference element in the reference optical fiber 110. The following equation expresses a phase difference that may be detected:

$$\Delta\phi = \frac{2\pi(n\Delta L + L\Delta n)}{\lambda}$$

wherein $\Delta\phi$ represents the phase difference, n represents a refractive index of the optical fibers concerned, $\Delta n$ represents a variation in the refractive index, L represents a relative distance between the fiber Bragg grating concerned in the sensing optical fiber 109 and the reflective reference element in the reference optical fiber 110, $\Delta L$ represents a variation in this relative distance, and $\lambda$ represents a wavelength at which the fiber Bragg grating reflects light.

Accordingly, the processing and control arrangement 108 may provide a phase difference measurement signal on the basis of a detection signal representing an interference pattern at a wavelength, which is associated with a fiber Bragg grating. The processing and control arrangement 108 may provide another phase difference measurement signal on the basis of another detection signal representing another interference pattern at another wavelength, which is associated with another fiber Bragg grating. The processing and control arrangement 108 may thus provide two respective phase difference measurement signals, associated with two respective fiber Bragg gratings in the sensing optical fiber 109. The processing and control arrangement 108 may subtract one of the two respective phase difference measurement signals from the other phase difference measurement signal.

The processing and control arrangement 108 may thus provide a differential phase signal from two respective interference patterns at two respective wavelengths associated with two respective fiber Bragg gratings in the sensing optical fiber 109. The differential phase signal then pertains to a zone between the two respective fiber Bragg gratings, whereby a fiber Bragg grating constitutes a boundary of this zone. In effect, a zone between two respective fiber Bragg gratings can be regarded as constituting an artificial Fabry-Perot cavity.

The differential phase signal may represent a physical quantity in the zone concerned, which thus constitutes a measurement zone. A physical quantity, such as, for example, vibration, strain, temperature, sound, and elongation (stretch), may affect one or more parameters in the equation expressing the phase difference presented hereinbefore. The physical quantity may affect the phase difference that may be detected for one of the two respective fiber Bragg gratings differently from the phase difference that may be detected for the other fiber Bragg grating.

In the example presented hereinbefore, a measurement zone between the first fiber Bragg grating FBG1 and a second fiber Bragg grating FBG2 may thus be defined. The processing and control arrangement 108 may resolve the aforementioned first interference pattern into a first phase difference that is associated with the first fiber Bragg grating FBG1. The processing and control arrangement 108 may resolve the second interference pattern into a second phase difference that is associated with the second fiber Bragg grating FBG2. The two respective aforementioned phase differences may be in the form of two respective signals. The processing and control arrangement 108 may then determine a differential between the first phase difference and the second phase difference that have been measured. This differential phase, which may also be in the form of a signal, pertains to the measurement zone that extends between the first fiber Bragg grating FBG1 and the second fiber Bragg grating FBG2. The differential phase may thus express a physical quantity in this measurement zone.

Such a scheme based on differential phase measurement between two respective fiber Bragg gratings allows low noise, precise measurements. This is due the following. In typical conditions, an interference pattern associated with a single fiber Bragg grating may significantly be affected by extrinsic noise and drift. A phase measurement signal that is derived from the interference pattern will also be affected by this extrinsic noise and drift. In case two such interference patterns are obtained for two respective fiber Bragg gratings, extrinsic noise and drift in the one and the other interference pattern will be relatively strongly correlated. Consequently, there is a noise and drift cancellation effect if a measurement is based on a difference of between two respective phase measurement signals derived from two respective interference patterns. It should be noted that dispersion effects can be calculated and, consequently, compensated for.

Figure 2:
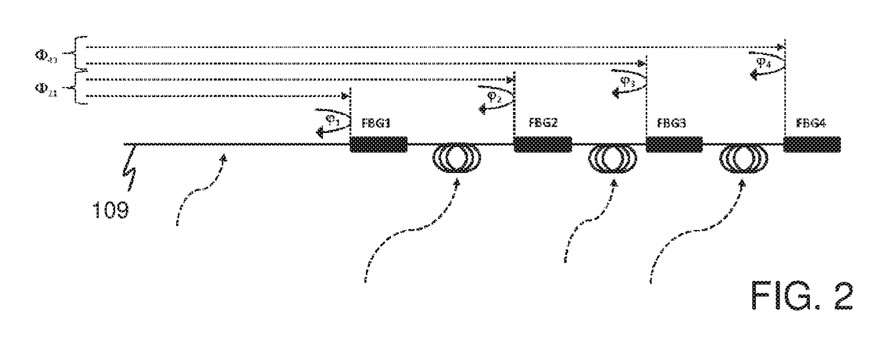
FIG. 2 is a conceptual diagram of a scheme based on differential phase measurement between two respective fiber Bragg gratings in the optical fiber-based sensor system.

FIG. 2 conceptually illustrates the scheme based on differential phase measurement between two respective fiber Bragg gratings. In this example, the sensing optical fiber 109 comprises four fiber Bragg gratings. A differential phase measurement may be carried out between a first fiber Bragg grating FBG1 and a second fiber Bragg grating FBG2. Another differential phase measurement may be carried out between a third fiber Bragg grating FBG3 and a fourth fiber Bragg grating FBG4. In these measurements, noise in the sensing optical fiber 109 between the optical coupler 103 and the first fiber Bragg grating FBG1 is effectively suppressed. Any unwanted signal between the second fiber Bragg grating FBG2 and the third fiber Bragg grating FBG3 is also effectively suppressed.

Referring again to FIG. 1, the optical coupler 103 may be of the 3×3 type. This contributes to achieving relatively precise measurements, although a different type of optical coupler could be used. This is because a 3×3 optical coupler provides an interference pattern from which phase information can be retrieved relatively precisely and at relatively high speed, allowing a relatively large measurement bandwidth. In contrast, in a basic interferometer phase information and amplitude information may be mixed up, which may introduce some imprecision, ambiguity, if the amplitude information is not precisely known.

A calibration loop may further contribute to achieving relatively precise measurements. The phase modulator 111, shown in FIG. 1 may form part of this calibration loop. Alternatively, or in addition, the polarization controller 112 may form part of this calibration loop. The phase modulator 111 may introduce a defined phase modulation in the reference optical fiber 110. The polarization controller 112 may introduce a defined polarization modulation in the reference optical fiber 110. Such a defined modulation is preferably in the form of a periodic signal having a frequency that is outside a bandwidth of interest with respect to measurements that are carried out.

The defined modulation will produce a response signal within the system, for example, at the array of optical detectors 104. The response signal can be compared with a reference signal so as to generate a compensation signal that compensates for one or more artifacts within the system. These artifacts may include, for example, light intensity variations, chromatic dispersion, coupler imbalance, fiber Bragg grating reflectivity change, and detector gain imbalance. It should be noted that the defined modulation that is introduced may be present at respective wavelengths of respective fiber Bragg gratings that are used in a measurement. Accordingly, a distinct calibration can be made for each wavelength. This calibration can be "on the fly".

In the optical fiber-based sensor system 100, different measurement zones can thus be addressed, as it were, by means of different wavelengths. As explained hereinbefore, a particular measurement zone, which extends between two fiber Bragg gratings, can be addressed by two different wavelengths, one being associated with one of the two fiber Bragg gratings, the other wavelength being associated with the other fiber Bragg grating.

There are basically two modes of addressing a measurement zone: in a wavelength division multiplex mode and a time division multiplex mode. In the wavelength division multiplex mode, the light that the light source 101 provides simultaneously has components of the two respective wavelengths associated with the two respective fiber Bragg gratings that define the measurement zone. In the time division multiplex mode, the light that the light source 101 provides is alternately of one of the two respective wavelengths and of the other wavelength. That is, the light is of one of the two respective wavelengths during a series of successive timeslots, and is of the other wavelength during another series of successive timeslots. These series of successive timeslots are interleaved, which implies that these have a same frequency, that is, a same periodicity, but are phase shifted, that is, time shifted, with respect to each other.

In order to operate in the wavelength division multiplex mode, the optical fiber-based sensor system 100 illustrated in FIG. 1 may comprise the following features. The light source 101 may be adapted to generate light simultaneously having respective components of respective wavelengths at which respective fiber Bragg gratings reflect light. The light source 101 may be, for example, a broadband light source or an array of narrowband light sources. The array of optical detectors 104 may be spectrally selective in order to distinguish between several interference patterns that simultaneously occur. For example, the optical detectors may be in the form of spectrometers.

The wavelength division multiplex mode allows simultaneously addressing multiple measurement zones. This mode also allows a relatively large measurement bandwidth while addressing multiple measurement zones. In this sense, the wavelength division multiplex mode is relatively flexible.

For example, referring to FIG. 1, let it be assumed that the light source 101 generates light simultaneously having components of four respective wavelengths at which the four respective fiber Bragg gratings FBG1, FBG2, FBG3, and FBG4 reflect light. The optical fiber-based sensor system 100 may then simultaneously carry out two different measurements in two different measurement zones: in a zone 21 between fiber Bragg gratings FBG1 and FGB2, and in another zone 43 between fiber Bragg gratings FBG3 and FGB4. These two respective measurements, which may simultaneously be carried out, are conceptually illustrated in FIG. 2. It should be noted that the two respective measurements need not concern a same physical quantity. The measurement in zone 21 may concern a given physical quantity, whereas the measurement in zone 43 may concern a different physical quantity. It should further be noted that, in this example, the optical fiber-based sensor system 100 may simultaneously carry out measurements in other zones that can be defined by the four respective fiber Bragg gratings FBG1, FBG2, FBG3, and FBG4, such as, for example, zone 31, and zone 32 indicated in FIG. 1.

In order to operate in the time division multiplex mode, the optical fiber-based sensor system 100 illustrated in FIG. 1 may comprise the following features. The light source 101 may be adapted to operate in a time multiplex manner. The light source 101 may repetitively switch from providing light of one wavelength to providing light of another wavelength. The array of optical detectors 104 does not need to be spectrally selective. This is because respective interference patterns associated with respective fiber Bragg gratings occur successively, one at a time. The interference patterns occur in a defined repetitive manner in accordance with the aforementioned series of timeslots. For example, the array of optical detectors 104 may therefore comprise plain photo detectors for detecting an interference pattern.

The processing and control arrangement 108 may be adapted to carry out a time demultiplexing operation on the detection signals from the array of optical detectors 104. These detection signals represent the respective interference patterns in a time multiplex fashion. The time demultiplexing operation separates these interference patterns from each other and thus allows distinguishing between the respective interference patterns associated with respective measurement zones.

The optical fiber-based sensor system 100 may be adapted to exclusively address measurement zones in the wavelength division multiplex mode or in the time division multiplex mode, or in a combination of these modes, which is a mixed mode of operation. For example, referring to FIGS. 1 and 2, the light source 101 may be adapted to generate light that, in a first series of time intervals, simultaneously has components of two respective wavelengths at which fiber Bragg gratings FBG1 and FBG2 reflect light. The light source 101 may be adapted to generate light that, in a second series of time intervals, simultaneously has components of two respective wavelengths at which fiber Bragg gratings FBG3 and FBG4 reflect light. In the first series of time intervals, the zone 21 illustrated in FIG. 1 is addressed, which allows a measurement to be carried out in this measurement zone. In the second series of time intervals, the zone 43 illustrated in FIG. 1 is addressed, which allows a measurement to be carried out in this other measurement zone.

Other mixed mode schemes are also possible. For example, the same aforementioned measurements can also be carried out if, in a first series of time intervals, the light source 101 generates light that simultaneously has components of two respective wavelengths at which fiber Bragg gratings FBG1 and FBG3 reflect light and, in a second series of time intervals, simultaneously has components of two respective wavelengths at which fiber Bragg gratings FBG2 and FBG4 reflect light. In this example, the measurement zones 21 and 43 are addressed in a time multiplex fashion.

Various factors may be taken into consideration in selecting a suitable mode of operation. Cost can be a factor. In the wavelength division multiplex mode, the light source 101 may be relatively costly because the light source 101 needs to generate light simultaneously having respective components of respective wavelengths. The array of optical detectors 104 may also be relatively costly because the optical detectors need to be spectrally selective. For example, the optical detectors may need to be in the form of spectrometers, which may be relatively expensive devices. In contrast, the array of optical detectors 104 need not be spectrally selective in the time division multiplex mode and, therefore, may comprise relatively inexpensive devices. However, in the time division multiplex mode, the processing and control arrangement 108 may be relatively costly because this device needs to carry out a time demultiplexing operation. Moreover, the time division multiplex mode requires the light source 101 to operate in a time multiplex manner, which may require relatively expensive devices.

Measurement precision may also be a factor to be taken into consideration. In the time division multiplex mode, transient effects may occur while switching between respective wavelengths. These transient effects may adversely affect measurement precision.

Measurement bandwidth may be a further factor to be taken into consideration. Spectrometers, which may be required in the wavelength multiplex mode, have an acquisition bandwidth that may set a limit to the measurement bandwidth that can be achieved. The limit is half the acquisition bandwidth of the spectrometers. For the time division multiplex mode, the measurement bandwidth that can be achieved depends on a rate at which a measurement zone can be addressed. In effect, this rate constitutes a sampling rate. The measurement bandwidth is limited to half the sampling rate.

Yet another factor that may be taken into consideration concerns a number of measurement zones that are to be addressed. The time division multiplex mode may be less suited in case relatively many measurement zones need to be addressed. This because the light source 101 illustrated in FIG. 1 should then switch between relatively many different wavelengths. This switching may be costly to implement. Moreover, for the time multiplex mode of operation, it generally holds that the higher the number of measurement zones that are addressed is, the lower the measurement bandwidth will be, all other things being equal. In practice, there will be a maximum switching frequency with which the light source 101 can switch between respective frequencies. In case the light source operates at the maximum switching frequency, the more measurements zones that are addressed, the lower the sampling rate of a measurement zone is. Thus, as a general rule, in the time multiplex mode, the measurement bandwidth is inverse proportional to the number of measurement zones.

Figure 3:
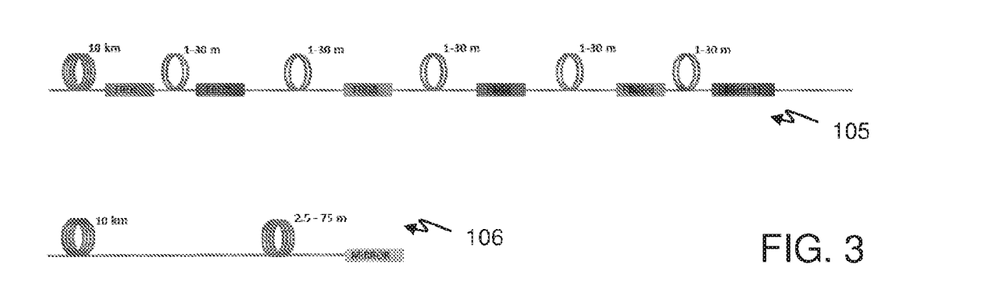
FIG. 3 is a schematic diagram of a combination of an optical measurement arm and a basic optical reference arm.

FIG. 3 schematically illustrates a combination of an optical measurement arm 105 and a basic optical reference arm 106. The optical measurement arm 105 comprises various fiber Bragg gratings, whereby distances between these fiber Bragg gratings are indicated, as well as a distance between an end for coupling to an optical coupler and a first fiber Bragg grating FBG1. The basic optical reference arm 106 comprises a mirror that is located at an end opposite to an end for coupling to an optical coupler. Distances are indicated too.

Figure 4:
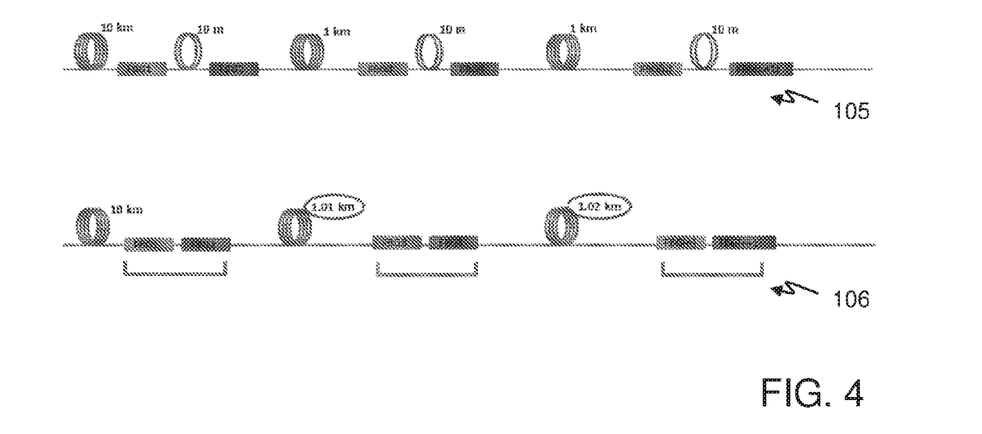
FIG. 4 is a schematic diagram of another combination of an optical measurement arm and an optical reference arm with equivalent fiber Bragg gratings.

FIG. 4 schematically illustrates another combination of an optical measurement arm 105 and an optical reference arm 106 with equivalent fiber Bragg gratings. The optical measurement arm 105 comprises various fiber Bragg gratings, whereby distances between these fiber Bragg gratings are indicated, as well as a distance between an end for coupling to an optical coupler 103 and the first fiber Bragg grating FBG1. In the optical measurement arm 105, a first fiber Bragg grating FBG1 and a second fiber Bragg grating FBG2 may define a first measurement zone. A third fiber Bragg grating FBG3 and a fourth fiber Bragg grating FBG4 may define a second measurement zone. In the optical reference arm 106, two equivalent fiber Bragg gratings associated with a measurement zone are located relatively close to each other. In this example, an equivalent first fiber Bragg grating FBG1 is located relatively close an equivalent second fiber Bragg grating FBG2. Similarly, an equivalent third fiber Bragg grating FBG3 is located relatively close an equivalent fourth fiber Bragg grating FBG4. Distances are indicated too in FIG. 4, like in FIG. 3.

Figure 5:
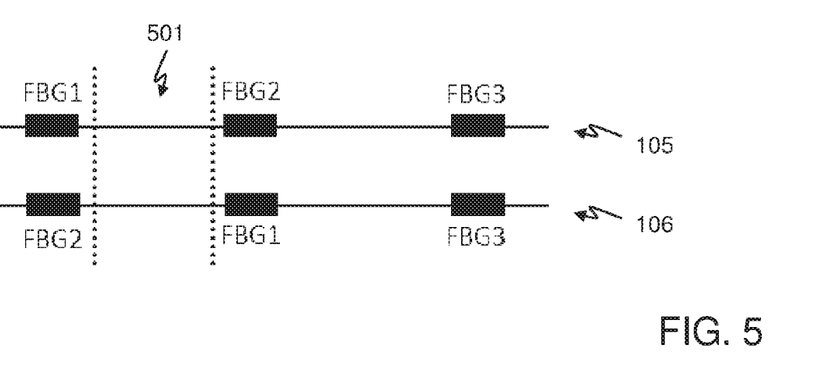
FIG. 5 is a schematic diagram of yet another combination of an optical measurement arm and an optical reference arm with inverse order fiber Bragg gratings.

FIG. 5 schematically illustrates another combination of an optical measurement arm 105 and an optical reference arm 106 with inverse order fiber Bragg gratings. In such a combination, a differential measurement zone 501 can be defined.

Figure 6:
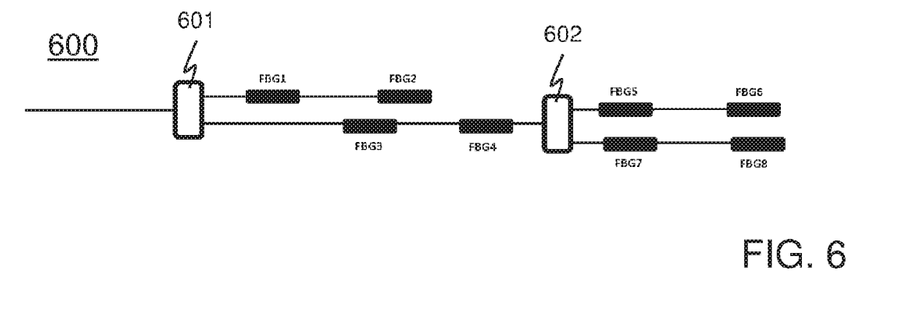
FIG. 6 is a schematic diagram of a branched optical measurement arm.

FIG. 6 schematically illustrates a branched optical measurement arm 600. The branched optical measurement arm 600 comprises various optical couplers, in this example two optical couplers 601, 602. A first optical coupler 601 defines two branches: a first branch and a second branch. The first branch comprises an optical fiber with two fiber Bragg gratings: a first fiber Bragg grating FBG1 and a second fiber Bragg grating FBG2. The second branch comprises an optical fiber with two other fiber Bragg gratings: a third fiber Bragg grating FBG3 and a fourth fiber Bragg grating FBG4. The second branch further comprises a second optical coupler 602 which defines two further branches: a third branch and a fourth branch. The third branch comprises an optical fiber with two fiber Bragg gratings: a fifth fiber Bragg grating FBG5 and a sixth fiber Bragg grating FBG6. The fourth branch comprises an optical fiber with two other fiber Bragg gratings: a seventh fiber Bragg grating FBG7 and an eight fiber Bragg grating FBG8. It should be noted that the scheme of differential phase measurement as described hereinbefore allows such branching. Two respective fiber Bragg gratings on a same branch may define a measurement zone.

Figure 7:
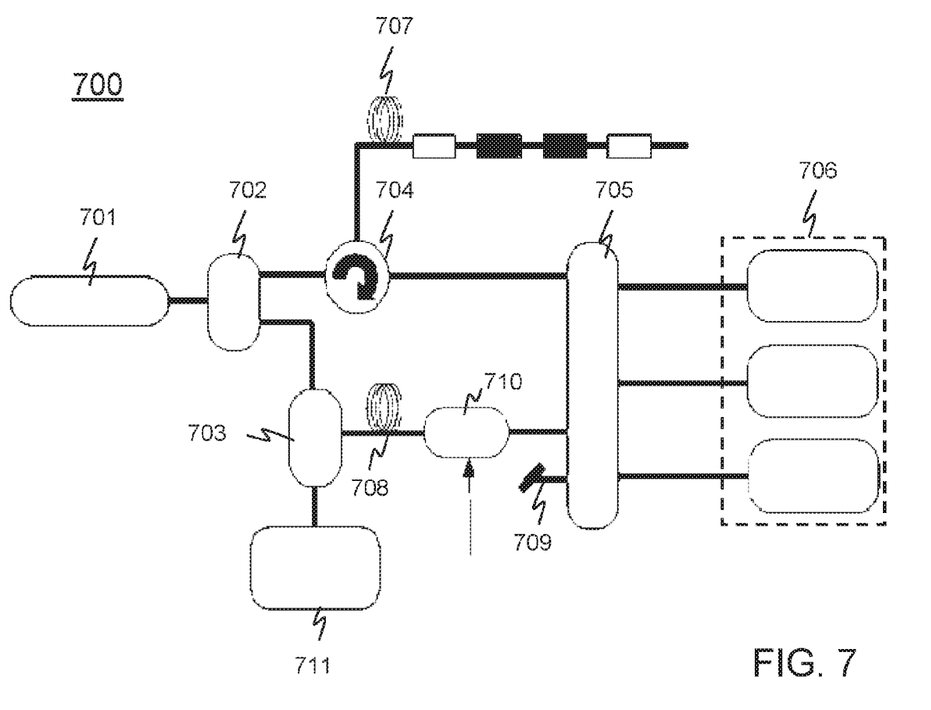
FIG. 7 is a block diagram of an alternative optical fiber-based sensor system.

FIG. 7 schematically illustrates an alternative optical fiber-based sensor system 700. The alternative system is represented in a block diagram. The alternative system comprises a light source 701, two optical splitters 702, 703, an optical circulator 704, an optical coupler 705 of the 3×3 type, an array of optical detectors 706, a sensing optical fiber 707, a reference optical fiber 708, a terminated end 709. The alternative system 700 may further comprise a phase modulator 710 and an optical monitoring arrangement 711. The alternative system 700 may further comprise a processing and control arrangement, which is not represented in FIG. 7 for reasons of simplicity and convenience.

In the alternative system 700, light from the light source 701 passes through the reference optical fiber 708 and then reaches the optical coupler 705. The reference optical fiber 708 thus need not comprise a reflective element. For the rest, the alternative system 700 may operate in a way similar to that in which the system 100 illustrated in FIG. 1 operates, as described hereinbefore.

In essence, what has been described is an optical fiber-based sensor system comprising an optical fiber having at least two fiber Bragg gratings, one of which reflects light of one wavelength, another fiber Bragg grating reflecting light of another wavelength. In this system, a multi-wavelength optical read-out arrangement applies a phase detection to light reflected by the one fiber Bragg grating and applies a phase detection to light reflected by the other fiber Bragg grating. A measurement is based on a differential between respective signals produced by these respective phase detections.

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied in numerous types of products or methods related to measurements based on optical fibers. For example, the invention may be applied in any type of domain, such as, for example, structure monitoring, energy industry, surveillance, seismic applications, oil and gas industry, and metrology. Acoustic transducer applications may include fiber optic geophones or hydrophones The invention may be implemented in numerous manners. For example, a basic embodiment may constitute a single point monitoring device, which continuously monitors a given quantity at one particular location only, and does therefore not require any switching between different measurement zones. Other embodiments in which multiple measurement zones are addressed may operate in a fully time multiplex mode, in which a single measurement zone is addressed at a time, or may operate in a fully wavelength multiplex mode, in which all measurement zones measurement zones are simultaneously and continuously addressed. A mixed mode is also possible. A measurement zone may have any length in a range that may vary from tens of millimeters to hundreds of meters, or even kilometers. The length may be limited by a coherence length of a laser, or a set of lasers, that is used.

The term "fiber Bragg grating" should be understood in a broad sense. The term may embrace any element or structure that has a wavelength dependent reflectivity characteristic.

In general, there are numerous different ways of implementing the invention, whereby different implementations may have different topologies. In any given topology, a single module may carry out several functions, or several modules may jointly carry out a single function. In this respect, the drawings are very diagrammatic. There are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the figures may be implemented by means of one or more dedicated circuits, whereby a particular circuit topology defines a particular function.

There are numerous ways of storing and distributing a set of instructions, that is, software, which allows operating a system in accordance with the invention. For example, software may be stored in a suitable device readable medium, such as, for example, a memory circuit, a magnetic disk, or an optical disk. A device readable medium in which software is stored may be supplied as an individual product or together with another product, which may execute the software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. An optical fiber-based sensor system, comprising:
   a first optical fiber having:
      a first fiber grating at a first location in the first optical fiber, reflecting light of a first wavelength; and
      a second fiber grating at a second location in the first optical fiber, reflecting light of a second wavelength;
   a second optical fiber; and
   an optical read-out arrangement adapted to generate the light of the first wavelength and the light of the second wavelength, to inject the light of the first wavelength and the light of the second wavelength in the first optical fiber and in the second optical fiber, to measure a first phase difference between the light of the first wavelength emanating from the first optical fiber and the light of the first wavelength emanating from the second optical fiber, to measure a second phase difference between the light of the second wavelength emanating from the first optical fiber and the light of the second wavelength emanating from the second optical fiber, and to provide a measurement result based on a difference between the first phase difference and the second phase.

2. An optical fiber-based sensor system according to claim 1, wherein the optical read-out arrangement comprises:
   a light-generating arrangement adapted to generate the light simultaneously having light components of the first wavelength and light components of the second wavelength; and
   a spectrally selective phase measurement arrangement adapted to make a distinction between the light components of the first wavelength emanating from the first optical fiber and from the second optical fiber and the light components of the second wavelength emanating from the first optical fiber and from the second optical fiber, so as to concomitantly measure the first phase difference and the second phase difference.

3. An optical fiber-based sensor system according to claim 1, wherein the optical read-out arrangement comprises:

a light-generating arrangement adapted to generate the light of the first wavelength in a first series of time intervals and to generate the light of the second wavelength in a second series of time intervals, whereby the first series of time intervals and the second series of time intervals are interleaved; and a phase measurement arrangement adapted to measure the first phase difference in the first series of time intervals and the second phase difference in the second series of time intervals.

4. An optical fiber-based sensor system according to claim 2, wherein the light-generating arrangement comprises:
a first light source adapted to generate the light of the first wavelength;
a second light source adapted to generate the light of the second wavelength; and
an optical coupling arrangement adapted to inject in the first optical fiber and in the second optical fiber a combination of the light of the first wavelength and the light of the second wavelength.

5. An optical fiber-based sensor system according to claim 4, wherein at least the first light source is tunable.

6. An optical fiber-based sensor system according to claim 3, wherein the light-generating arrangement comprises:
a tunable light source;
an optical coupling arrangement adapted to inject light from the tunable light source in the first optical fiber and in the second optical fiber; and
a controller adapted to periodically tune the tunable light source so that, in the first series of time intervals, the light is the light of the first wavelength and that, in the second series of time intervals, the light is the light of the second wavelength.

7. An optical fiber-based sensor system according to claim 3, wherein the light-generating arrangement comprises:
a first light source adapted to generate the light of the first wavelength;
a second light source adapted to generate the light of the second wavelength; and
an optical switch arrangement adapted to, in the first series of time intervals, inject the light of the first wavelength in the first optical fiber and in the second optical fiber, and, in the second series of time intervals, inject the light of the second wavelength in the first optical fiber and in the second optical fiber.

8. An optical fiber-based sensor system according to claim 3, wherein the light-generating arrangement comprises:
a first light source adapted to generate the light of the first wavelength;
a second light source adapted to generate the light of the second wavelength;
an optical coupling arrangement adapted to inject the light of the first wavelength and the light of the second wavelength in the first optical fiber and in the second optical fiber; and
a controller adapted to activate the first light source only in the first series of time intervals and to activate the second light source only in the second series of time intervals.

9. An optical fiber-based sensor system according to claim 1, wherein the second optical fiber is provided with a light-reflecting arrangement reflecting the light of the first wavelengths and the light of the second wavelength.

10. An optical fiber-based sensor system according to claim 1, the second optical fiber comprising:
an equivalent first fiber grating reflecting the light of the first wavelength; and
an equivalent second fiber grating reflecting the light of the second wavelength.

11. An optical fiber-based sensor system according to claim 10, wherein:
the equivalent first fiber grating is at an equivalent first location in the second optical fiber, which corresponds with the first location of the first fiber grating in the first optical fiber; and
the equivalent second fiber grating is at an equivalent second location in the second optical fiber, which corresponds with the second location of the second fiber grating in the first optical fiber.

12. An optical fiber-based sensor system according to claim 10, wherein:
the equivalent first fiber grating is at a non-equivalent first location in the second optical fiber, which corresponds with the second location of the second fiber grating in the first optical fiber; and
the equivalent second fiber grating is at a non-equivalent second location in the second optical fiber, which corresponds with the first location of the first fiber grating in the first optical fiber.

13. An optical fiber-based sensor system according to claim 1, wherein:
at least one of the first optical fiber and the second optical fiber comprises a modulation arrangement adapted to induce a modulation in light emanating from the optical fiber concerned; and
the optical read-out arrangement is adapted to extract a response to the modulation and to compensate for an artifact in the optical fiber-based sensor system based on a comparison of the response that has been extracted with a reference response.

14. An optical fiber-based sensor system according to claim 1, wherein the optical read-out arrangement comprises an optical coupler of an N×N type that has a first set of N optical ports and a second set of N optical ports, N being an integer greater than 2, whereby:
a first port of the first set is coupled to receive the light emanating from the first optical fiber;
a second port of the first set is coupled to receive the light emanating from the second optical fiber;
a third port of the first set is coupled to a non-reflective arrangement;
a first port of the second set is coupled to a first optical power detector;
a second port of the second set is coupled to a second optical power detector; and
a third port of the second set is coupled to a third optical power detector.

15. An optical fiber-based sensor system according to claim 1, wherein:
the first optical fiber comprises a set of respective fiber gratings at respective locations in the first optical fiber to reflect light of respective wavelengths, the first fiber grating and the second fiber grating forming part of the set of respective fiber gratings; and
the optical read-out arrangement is adapted to generate light of the respective wavelengths that the respective fiber gratings reflect, to inject the light in the first optical fiber and in the second optical fiber, to measure a phase difference between light of a given wavelength emanating from the first optical fiber due to reflection by a given fiber grating and light of the same given wavelength emanating from the second optical fiber, to measure a further phase difference between light of another given wavelength emanating from the first optical fiber due to reflection by another given fiber grating and light of the same other given wavelength emanating from the second optical fiber, and to provide a measurement result based on a difference between the phase difference and the further phase difference that have been measured.

16. An optical fiber-based sensor system according to claim 1, wherein the first optical fiber forms a branch in a branched structure of optical fibers comprising at least one optical coupler from which several branches extend.

17. An optical fiber-based sensing method, comprising:
a first optical fiber having a first fiber grating at a first location in the first optical fiber and reflecting light of a first wavelength, and a second fiber grating at a second location in the first optical fiber and reflecting light of a second wavelength, and a second optical fiber, wherein the method comprises:
generating light of the first wavelength and of the second wavelength;
injecting the light in the first optical fiber and in the second optical fiber;
measuring a first phase difference between light of the first wavelength emanating from the first optical fiber and light of the first wavelength emanating from the second optical fiber;
measuring a second phase difference between light of the second wavelength emanating from the first optical fiber and light of the second wavelength emanating from the second optical fiber: and
providing a measurement result based on a difference between the first phase difference and the second phase difference that have been measured.

* * * * *